(12) United States Patent
Buda et al.

(10) Patent No.: US 11,037,064 B2
(45) Date of Patent: Jun. 15, 2021

(54) RECOGNIZING RECURRENT CROWD MOBILITY PATTERNS

(71) Applicant: INTERNATIONAL BUSINESS MACHINES CORPORATION, Armonk, NY (US)

(72) Inventors: Teodora Buda, Dublin (IE); Faisal Ghaffar, Dunboyne (IE); Patrick J. O'Sullivan, Ballsbridge (IE); Hitham Ahmed Assem Aly Salama, Dublin (IE); Lei Xu, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 688 days.

(21) Appl. No.: 15/788,336

(22) Filed: Oct. 19, 2017

(65) Prior Publication Data
US 2019/0122229 A1    Apr. 25, 2019

(51) Int. Cl.

| | |
|---|---|
| G06N 5/04 | (2006.01) |
| G06Q 50/00 | (2012.01) |
| G06Q 30/02 | (2012.01) |
| G06N 5/02 | (2006.01) |
| H04W 4/029 | (2018.01) |
| H04W 24/08 | (2009.01) |
| H04W 4/02 | (2018.01) |
| G01S 7/41 | (2006.01) |
| G06F 16/29 | (2019.01) |
| G01S 13/00 | (2006.01) |

(52) U.S. Cl.
CPC ............ *G06N 5/046* (2013.01); *G06N 5/022* (2013.01); *G06N 5/048* (2013.01); *G06Q 30/0201* (2013.01); *G06Q 30/0205* (2013.01); *G06Q 50/01* (2013.01); *H04W 4/027* (2013.01); *H04W 4/029* (2018.02); *H04W 24/08* (2013.01); *G01S 7/415* (2013.01); *G01S 13/003* (2013.01); *G06F 16/29* (2019.01)

(58) Field of Classification Search
None
See application file for complete search history.

(56) References Cited

U.S. PATENT DOCUMENTS

| | | | |
|---|---|---|---|
| 6,519,465 B2 * | 2/2003 | Stilp | G01S 5/02 455/456.1 |
| 8,554,788 B2 * | 10/2013 | Jang | G06F 16/29 707/776 |

(Continued)

OTHER PUBLICATIONS

Abbasi et al., "Ranking the City: The Role of Location-Based Social Media Check-Ins in Collective Human Mobility Prediction," International Journal of Geo-Information, vol. 6, No. 5, 2017 (13 pages).

*Primary Examiner* — Gurkanwaljit Singh
(74) *Attorney, Agent, or Firm* — Griffiths & Seaton PLLC

(57) ABSTRACT

A system and method for recognizing recurrent crowd mobility patterns in a defined geographical area are presented. A crowded area may be determined for a selected geographical region at predefined time intervals based on spatial distribution of a plurality of users collected from a social media network. A crowd footprint may be generated according to the crowded areas determined at the predefined time intervals. Recurrent crowd mobility patterns may be detected according to the crowd footprint.

14 Claims, 7 Drawing Sheets

(56) References Cited

U.S. PATENT DOCUMENTS

| | | | |
|---|---|---|---|
| 8,972,177 B2* | 3/2015 | Zheng | H04N 21/4126 |
| | | | 701/454 |
| 9,443,016 B2* | 9/2016 | Lo | G06F 16/951 |
| 9,686,652 B2 | 6/2017 | Aas | |
| 9,699,603 B2 | 7/2017 | Shen et al. | |
| 9,949,069 B2* | 4/2018 | Shibayama | G06Q 50/10 |
| 2011/0225194 A1* | 9/2011 | Jang | G06F 16/29 |
| | | | 707/776 |
| 2012/0158633 A1* | 6/2012 | Eder | G16H 15/00 |
| | | | 706/46 |
| 2014/0052680 A1* | 2/2014 | Nitz | G06N 5/04 |
| | | | 706/46 |
| 2014/0052681 A1* | 2/2014 | Nitz | H04L 51/02 |
| | | | 706/46 |
| 2014/0099880 A1* | 4/2014 | Thistoll | H04L 12/1845 |
| | | | 455/3.06 |
| 2014/0152836 A1* | 6/2014 | Morris | G06T 7/292 |
| | | | 348/159 |
| 2014/0340405 A1 | 11/2014 | Dos Santos et al. | |
| 2014/0370844 A1* | 12/2014 | Lara | H04W 4/21 |
| | | | 455/405 |
| 2015/0142515 A1* | 5/2015 | Ghosh | G06Q 30/0202 |
| | | | 705/7.31 |
| 2016/0028471 A1* | 1/2016 | Boss | H04W 28/0289 |
| | | | 455/406 |
| 2016/0180738 A1* | 6/2016 | Garis | G09B 19/00 |
| | | | 434/236 |
| 2016/0261992 A1 | 9/2016 | Fletcher | |
| 2016/0315682 A1 | 10/2016 | Liu et al. | |
| 2016/0344702 A1* | 11/2016 | Ukena | H04L 63/0421 |
| 2017/0086084 A1* | 3/2017 | Jarvis | H04W 24/10 |
| 2017/0132305 A1 | 5/2017 | Wang et al. | |
| 2017/0195854 A1 | 7/2017 | Shi-Nash et al. | |
| 2017/0230789 A1* | 8/2017 | Shibayama | G06Q 30/0203 |

* cited by examiner

RECOGNIZING RECURRENT CROWD MOBILITY PATTERNS

BACKGROUND OF THE INVENTION

Field of the Invention

The present invention relates in general to computing systems, and more particularly to, various embodiments for recognizing recurrent crowd mobility patterns in a defined geographical area and at selected time intervals by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products. As great strides and advances in technologies come to fruition, the greater the need to make progress in these systems advantageous for efficiency, communication, and improvement in society.

SUMMARY OF THE INVENTION

Various embodiments for recognizing recurrent crowd mobility patterns in a defined geographical area and at selected time intervals using one or more processors are provided. In one embodiment, by way of example only, a method for recognizing recurrent crowd mobility patterns in a defined geographical area and at selected time intervals, again by a processor, is provided. A crowded area may be determined for a selected geographical region at predefined time intervals based on spatial distribution of a plurality of users collected from a social media network. A crowd footprint may be generated according to the crowded areas determined at the predefined time intervals. Recurrent crowd mobility patterns may be detected according to the crowd footprint.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
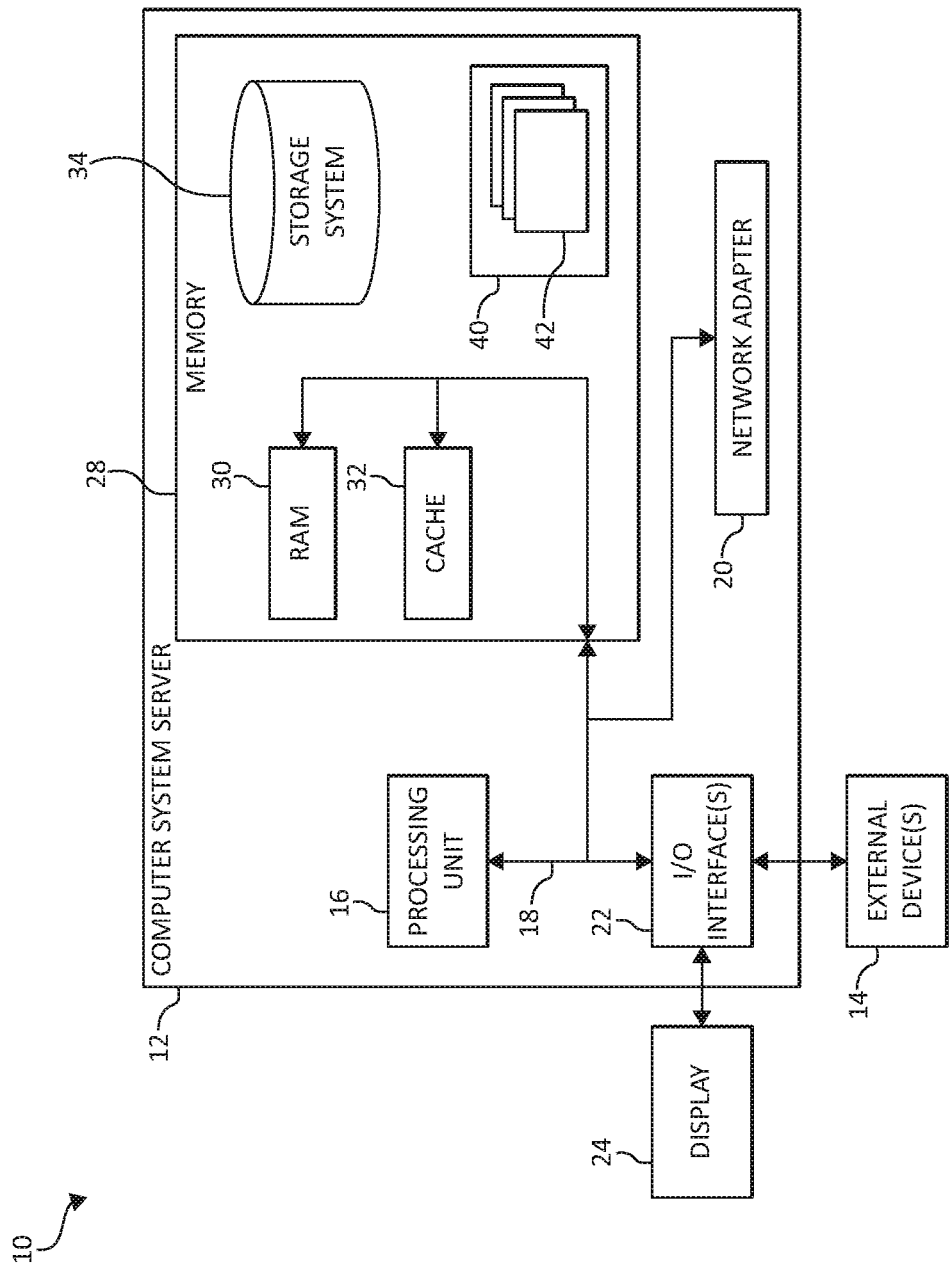
FIG. 1 is a block diagram depicting an exemplary computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement. Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

For many companies and organizations, it may be important to learn how people move in a city or even across cities. For these organizations, there are many key decisions relying upon the information of where the people may be located and the various patterns of movement each and every day (e.g., mobility of these persons such as where people come and go). Examples of such decisions include determining when and where to build new buildings, open new stores and shops, provide new transportation services and routes for growing populations or crowded areas, increase emergency service, and the like. Many crowds of people often populate certain geographical regions at certain times of the day and at various intensities and degrees. For example, a certain zip code may be more crowded at a certain time than at other times (e.g., a large crowd is gathered at a zip code full of restaurants and shops during a lunch hour).

It is common for most, if not all, persons within these crowded areas to have a computing device such as, for example, an IoT device (e.g., tablet or smart phone). Many persons within the crowded areas may use and employ one or more social networking applications at various times. The development and improvement of these social networking applications (e.g., Facebook®, Twitter®, Foursquare®, etc.) provide the ability for users to create and share social media content. Examples of social media content may include, for example, a text comment, videos, photos, status update (e.g., "likes"), etc. Social networking applications may be employed in a variety of computing devices such as, for example, IoT computer devices. The social media content may be stored on a provider server and may be accessed by users on client devices such as smart phones (e.g., an IoT device) through each provider's interface.

Accordingly, there is a need for a method for identifying and recognizing crowd movements within a geographical area and for selected periods of time using social media network applications. In one aspect, the use of IoT computer devices (e.g., a smart phone) by one or more users may be employed using Location-based Social Networks ("LBSNs"), which enable users to share their activity-related choices using the person's various social networking applications.

In one aspect, the LBSNs may report geographical coordinates of the user and also identify the venues, locations, or coordinates where users may check-in such as, for example, restaurants, outdoor activities, or a stadium. In other words, the LBSNs enable each user to correlate the location of the user along with the activity of the user. In addition, these communication broadcasts of the user via the computing devices and the LBSN may contain semantic data and information such as, for example, tips, comments or recommendations on the venues visited by the users (e.g., "this restaurant is great" or "the stadium is really icy so be careful when walking up the stairs"). Also, the scale of LBSNs data may be based on the user's participation level, which may provide cultural, socio-demographic, and behavioral insights of different areas (e.g., a city.), etc.

In one aspect, various embodiments provide for recognizing recurrent crowd mobility patterns in a defined geographical area at selected or defined periods of time. A crowded area (e.g., a number of people gathered together) may be determined for a selected geographical region at predefined time intervals based on spatial distribution of a plurality of users collected from a social media network. A crowd footprint may be generated according to the crowded areas determined at the predefined time intervals. Recurrent crowd mobility patterns may be detected according to the crowd footprint.

In an additional aspect, various embodiments provide for detecting recurrent crowd mobility patterns such as, for example, by 1) crowd detection, 2) data preparation, and 3) recurrent crowd mobility pattern detection. For example, in step 1, a crowd detection operation may detect one or more crowded areas at certain time intervals given a certain geographical area. The crowd detection operation may be based on spatial distribution of one or more social life traces captured from an LBSN dataset. Social life traces may be social activity and/or the location of the person. For example, assume user A is in area "X" at time "T1" but later moves to area "Y". At time "T2" user A reports the "social activity" of user A (e.g., a social life trace). The LBSNs capture the social life activity (e.g., social life trace) of user A but also provides the location information.

The crowd detection operation may be applied to any dataset that represents a spatial-temporal distribution for the social life traces in a certain geographical area at one or more selected time intervals. In step 2, upon detecting one or more crowded areas, a data preparation operation may be performed such that data (e.g., detected crowded area data) may be transformed into a data structure (e.g., a structured text document) suitable for processing such as, for example, using a natural language processing ("NLP") operation. A document may be formulated for each day of a week (e.g., seven documents for each day such as, for example, Monday, Tuesday, Wednesday, Thursday, Friday, Saturday, Sunday), which consists of crowd footprints generated from the crowded areas at the certain time slots. The documents (e.g., the seven documents for each day of the week) may be used as input data such as, for example, as input data in step 3. In step 3, the generated documents may be used as input to discover one or more recurrent crowd mobility patterns over space and time.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
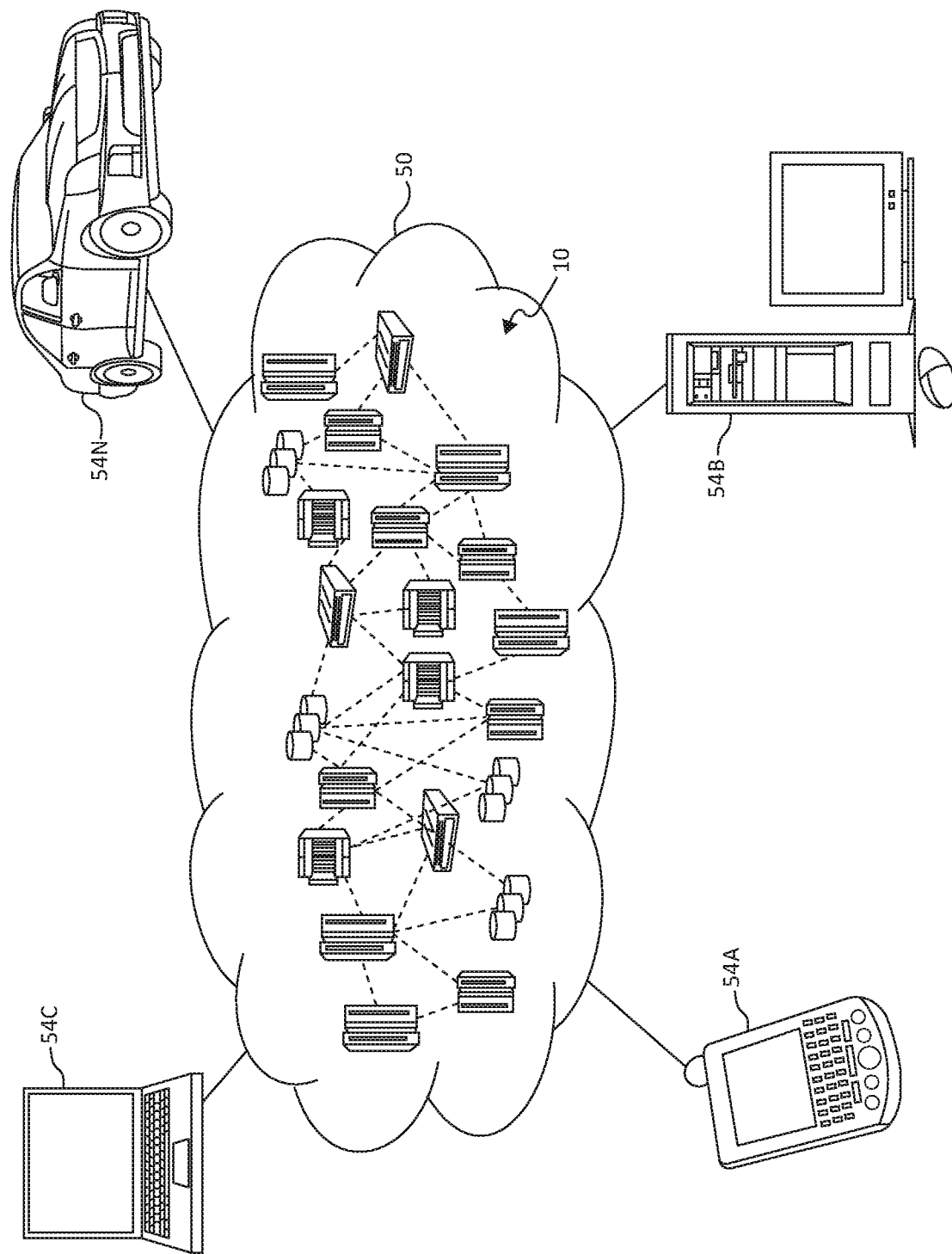
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
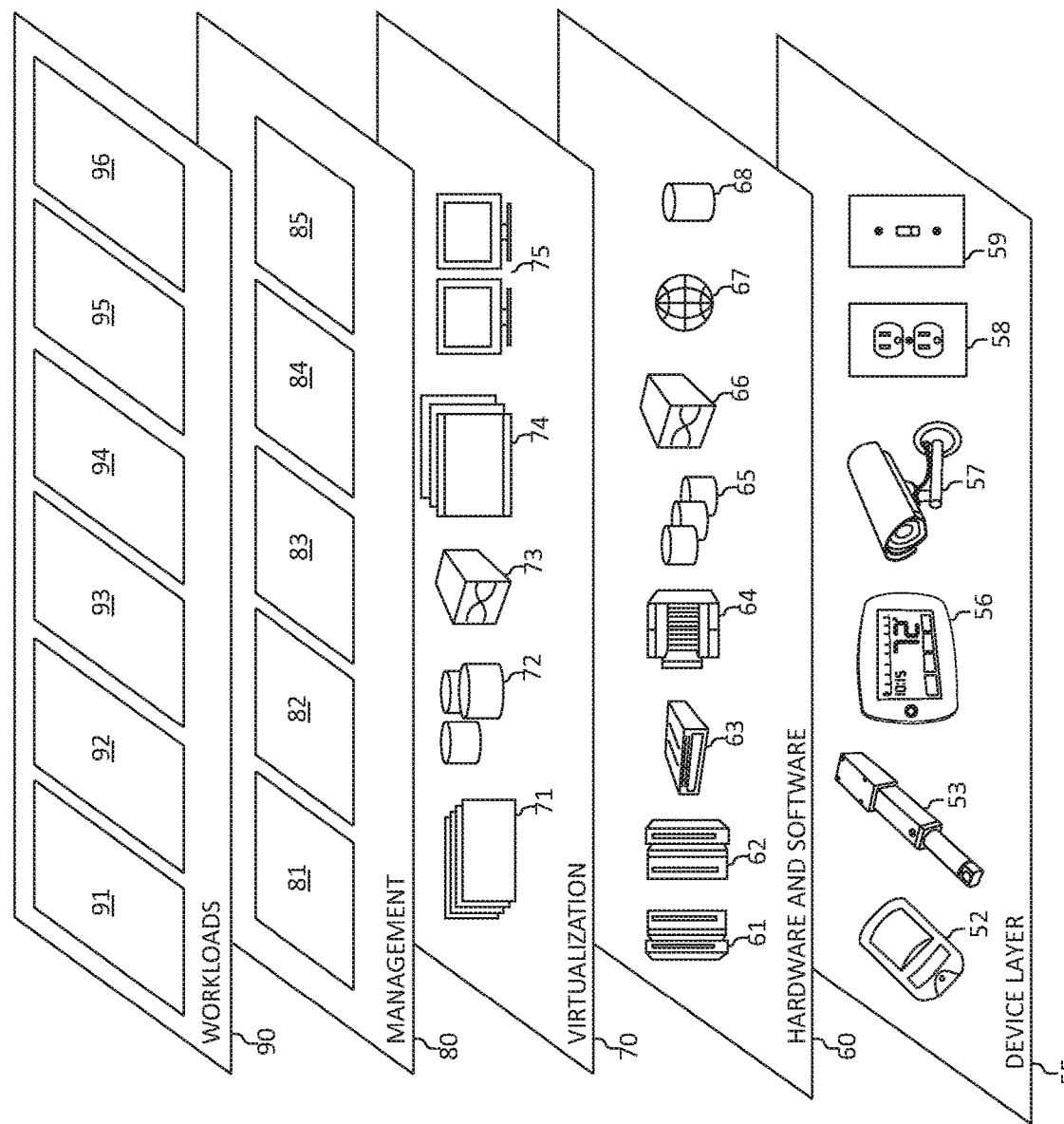
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various recurrent crowd mobility pattern detection workloads and functions 96. In addition, recurrent crowd mobility pattern detection workloads and functions 96 may include such operations as data analytics, data analysis, and as will be further described, notification functionality. One of ordinary skill in the art will appreciate that the recurrent crowd mobility pattern detection workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

In one aspect, the mechanisms of the illustrated embodiments provide a novel approach for detecting recurrent crowd mobility patterns such as, for example, crowd mobility patterns in cities using mobility data (e.g., latitude/longitude mobility dataset), LBSNs data, and time data. The recurrent crowd mobility patterns may be detected using unsupervised learning operations and one or more clustering operations (e.g., K-means) for detecting and extracting varies types of crowd patterns (e.g., patterns of crowds of people) in cities by grouping together selected time intervals (e.g., clustering one or more days of a week for selected time intervals). In one aspect, one or more probabilistic models or "topic models" may be employed for extracting recurrent crowd mobility patterns. The one or more topic models may provide one or more semantic structures of a document collection. Stated differently, the one or more topic models may be used for extracting recurrent crowd mobility patterns in cities such as, for example, using NLP (e.g., Latent Dirichlet Allocation ("LDA") processing) to automatically discover a user's routine behavior utilizing a mobility dataset. The NLP and artificial intelligence (AI) may be provided to process content and/or one or more topic models. In one example, an instance of IBM® Watson® (IBM and Watson are trademarks of International Business Machines Corporation) NLP may be used. The aspects of Watson that the described method and system makes use of are the technologies behind AlchemyLanguage® (AlchemyLanguage is a trademark of IBM). However, other NLP technologies or services may be used to provide the processed content as described herein.

In an additional aspect, the present invention provides for recognizing recurrent crowd mobility patterns in a defined geographical area such as, for example, a city that may be partitioned using zip codes, zones, regions, blocks, or divided sections using various data from LBSN and time data. In addition, mechanisms of the illustrated embodiments may estimate a crowd intensity level or degree thereby providing additional detail to understand the level of crowdedness. Moreover, the present invention provides for recognizing recurrent crowd mobility patterns by using a non-negative matrix factorization (NMF) and Gaussian Kernel Density Estimation (KDE) for extracting the recurrent crowd mobility patterns in cities which may depict crowd patterns and crowd shifts from one area to another during each day across various time-slots.

In view of the foregoing, consider the following examples. The present invention enables one or more users (e.g., city planners) to determine that a common, recurrent crowd mobility pattern for day "d" may shift from region "r1" at time slot "t1" to region "r2" at time slot "t2" so as to dynamically allocate cities' resources accordingly (e.g., energetic resources). Similarly, the communication operators may dynamically migrate communication network resources from region r1 to region r2 thereby reducing or eliminating costs from over provisioning other regions of cities with similar amounts of network resources. Moreover, the present invention enables detection of recurrent crowd mobility patterns by detecting anomalous and rare events. For instance, region "r3" may be detected as crowded (e.g., highest crowd level for region "r3") at time slot t2 and may thus raise an emergency alarm as anomalous behavior occurring at region "r3" compared to the expected pattern (region "r2" at time slot "t2" in this example) as one or more disasters change the recurrent patterns bringing people to different locations. For example, if there is an accident (e.g., an earthquake in a region), users (people or a "crowd of people") may change their recurrent expected pattern. The unexpected patterns or movements of the users may raise an alarm as something abnormal happening (e.g., the earthquake) in the region where the crowd was expected.

Figure 4:
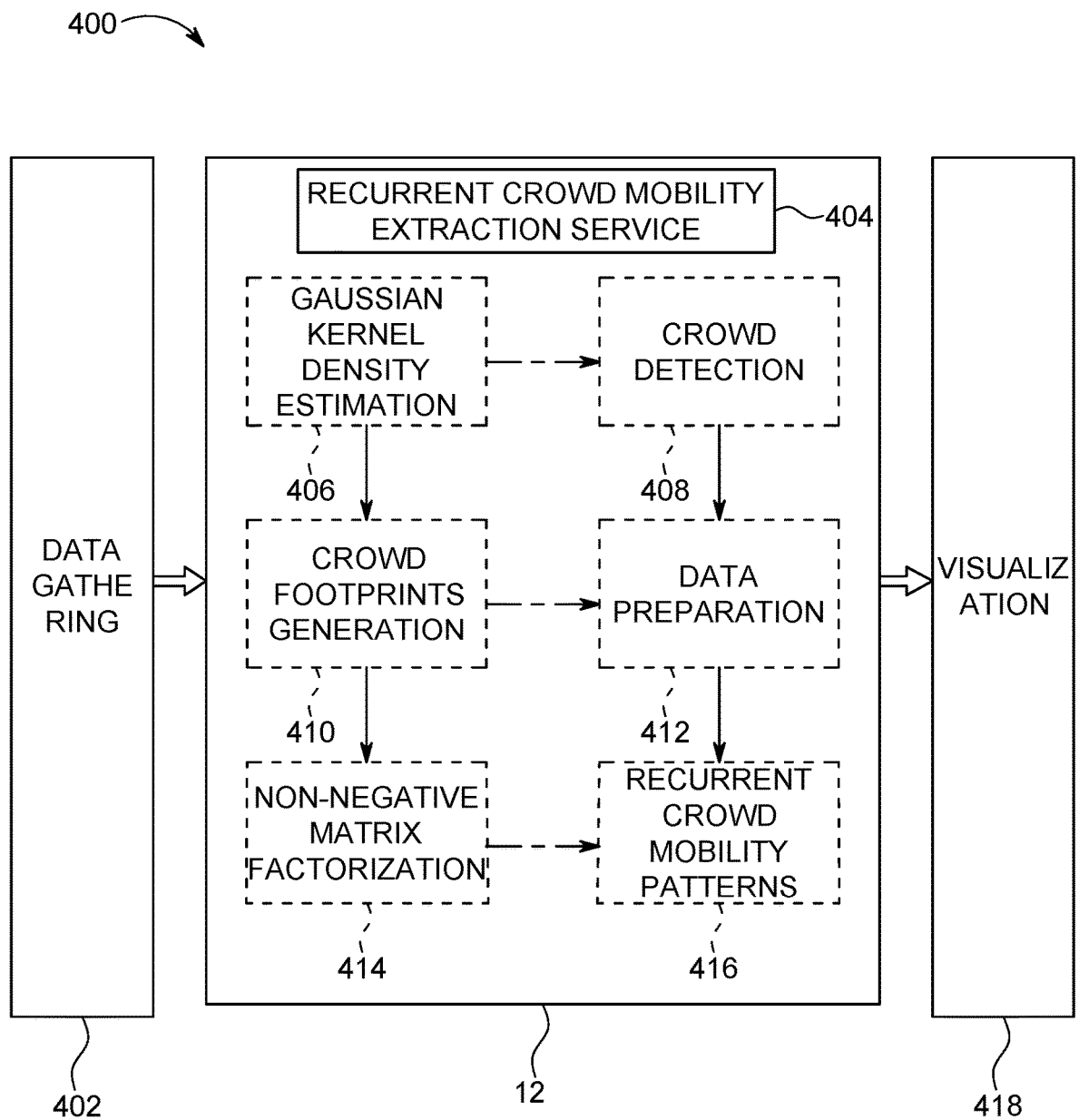
FIG. 4 is an additional block diagram depicting an exemplary functional relationship between various aspects of the present invention.

Turning now to FIG. 4, a block diagram of exemplary functionality 400 of a recurrent crowd mobility patterns recognition and monitoring system is depicted. As one of ordinary skill in the art will appreciate, the depiction of the various functional units in the recurrent crowd mobility patterns recognition and monitoring system 400 is for purposes of illustration, as the functional units may be located within recurrent crowd mobility patterns recognition and monitoring system 400 or elsewhere within and/or between distributed computing components. Also, the functional blocks 400 of the recurrent crowd mobility patterns recognition and monitoring system 400 may be implemented in hardware and/or software, such as by the computer/server 12 (FIG. 1), the workloads layer 90 (FIG. 3), and/or one or more processing unit(s) 16 to perform various computational, data processing and other functionality in accordance with various aspects of the present invention.

As shown, the various blocks of functionality are depicted with arrows designating the blocks' 400 relationships with each other and to show process flow of the recurrent crowd mobility patterns recognition and monitoring system 400. Additionally, descriptive information is also seen relating each of the functional blocks 400. As will be seen, many of the functional blocks may also be considered "modules" of functionality, in the same descriptive sense as has been previously described in FIGS. 1-3. Many of the functional blocks 400 may execute as background processes on various components, either in distributed computing components, or on the user device, or elsewhere, and generally unaware to the user performing generalized tasks of the present invention.

Starting in block 402, as a beginning operation for recurrent crowd mobility extraction service 404, data may be gathered in which check-in data may be collected from LBSNs for a selected geographical area (e.g., a city), which captures users' mobility data (e.g., large scale mobility data) for the selected geographical area. In order to extract the recurrent crowd mobility patterns, a Kernel Density Estimation (KDE) operation with Gaussian kernel may be applied for detecting crowd spots, as in blocks 406 and 408 (see also FIG. 5). Also, the output of the KDE operation may be used to construct the crowd footprints, as in block 410. The output of the KDE operation may also be prepared and converted into a data structure suitable for a Non-Negative Matrix Factorization (NMF) based model for extracting the recurrent crowd mobility patterns, as in blocks 412.

Moving to blocks 414 and 416, the crowd footprints (e.g., identified crowded areas) may be applied and inputted into a Non-Negative Matrix Factorization (NMF) operation so as to recognize the recurrent mobility patterns and determine when (e.g., time) and where (e.g., location) the crowd shifts during one or more days of the week. The recurrent crowd mobility patterns that are detected may be mapped for visualization (see FIG. 6). That is, the recurrent crowd mobility patterns that are detected may be mapped and displayed via an interactive graphical user interface of a computing device such as, for example, an IoT device (e.g., smart phone, computer, etc.) while highlighting the crowd intensity across space and time, as in block 418.

Figure 5:
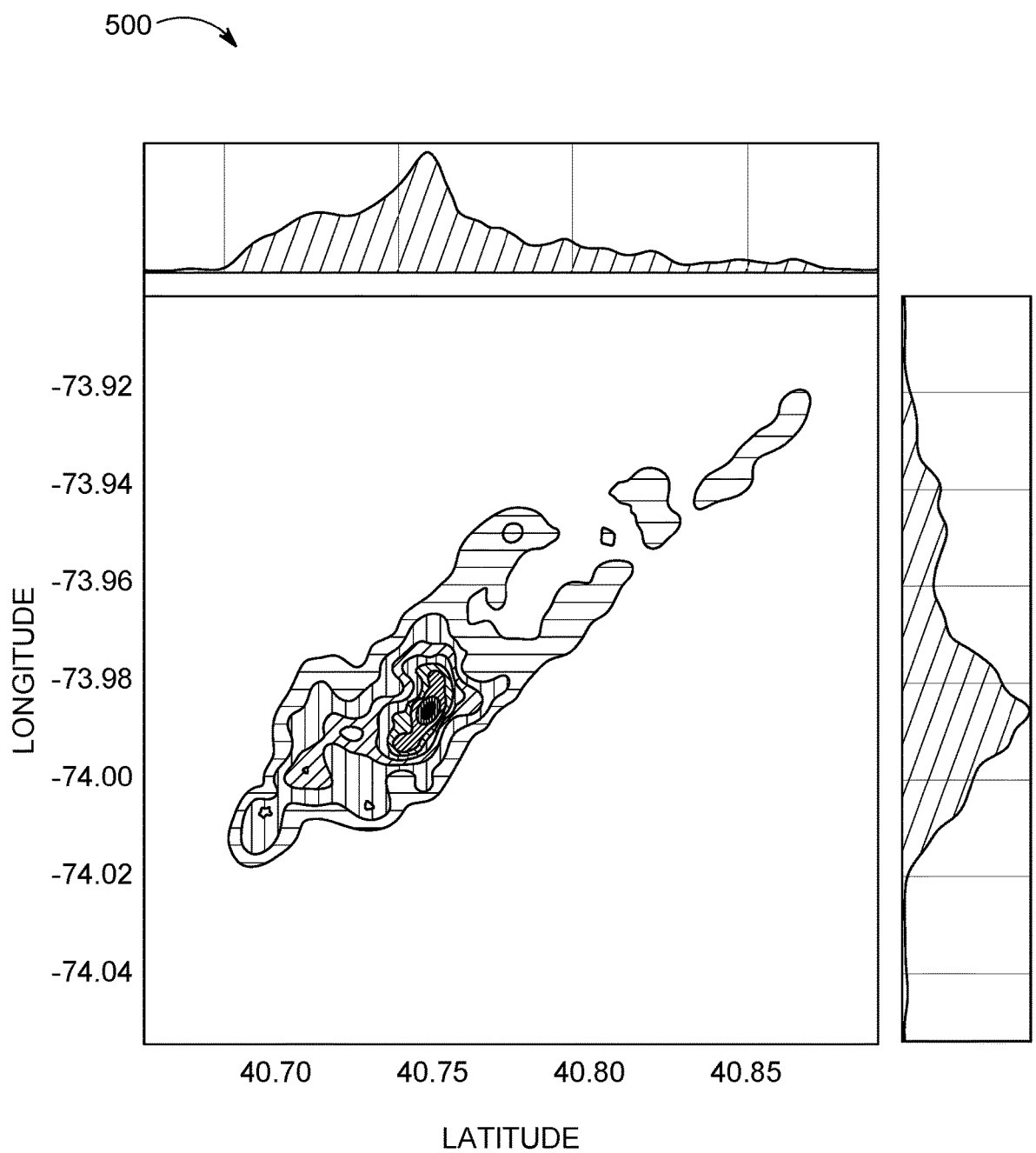
FIG. 5 is a map diagram depicting an exemplary identification of recurrent crowd mobility patterns for a geographical area in accordance with aspects of the present invention.

Turning now to FIG. 5, a map diagram depicting an exemplary identification of recurrent crowd mobility patterns for a geographical area is depicted. More specifically, FIG. 5 illustrates the KDE operation applied to LBSN data of a geographical area (e.g., a city). The map 500 depicts the latitude (e.g., latitude 40.70 to 40.85) on the X-axis and the longitude (e.g., −74.04 to −73.92) on the Y-axis of the geographical area map. Additionally, the intensity of the crowd is also displayed. As used in FIG. 5, by way of example only, the shades/patterns reflect highest density crowd areas, medium density crowd areas, and lowest density crowd areas. That is, the darker shades/patterns reflect the greatest amount of crowd density, the lightest shades/patterns reflect the least amount of crowd density (as compared to the greatest amount of crowd size), and the medium shades/colors reflect a crowd density greater than the least amount of crowd density but less than the greatest amount of crowd density.

Figure 6:
FIG. 6 is an additional map diagram depicting an exemplary identification of recurrent crowd mobility patterns for a selected time period in a geographical area in accordance with aspects of the present invention.

Turning now to FIG. 6, an additional map diagram 600 depicts an exemplary identification of recurrent crowd mobility patterns for a selected time period in a geographical area (e.g., a city). More specifically, map diagram 600 maps the recurrent crowd mobility patterns for a weekend day during the time periods between 8:00 a.m. to 12 p.m. As illustrated in FIG. 6, map 600 depicts the geographical area divided into one or more zones or "zip codes". Each zone or zip code reflects the intensity of the crowd according to various shades/colors for visual illustration. As used in FIG. 6, by way of example only, the shade/color (e.g., low, medium, high) reflects highest intensity crowd areas, medium intensity crowd areas, and lowest intensity crowd areas. That is, the darker color reflects the greatest amount of crowd intensity, the lightest shade/color reflects the least amount of crowd intensity (as compared to the greatest amount of crowd size), and the medium shade/color reflects a crowd intensity greater than the least amount of crowd intensity but less than the greatest amount of crowd intensity. That is, during the weekend day during the time periods between 8:00 a.m. to 12 p.m., the crowded areas may be displayed where the lightest shade/color, medium shade/color, and darkest shade/color indicate low crowded areas, medium-crowded areas, and highest crowded areas respectively. The recurrent crowd mobility patterns may be dynamically changed and illustrated in map 600 according to different time periods and/or locations.

Figure 7:
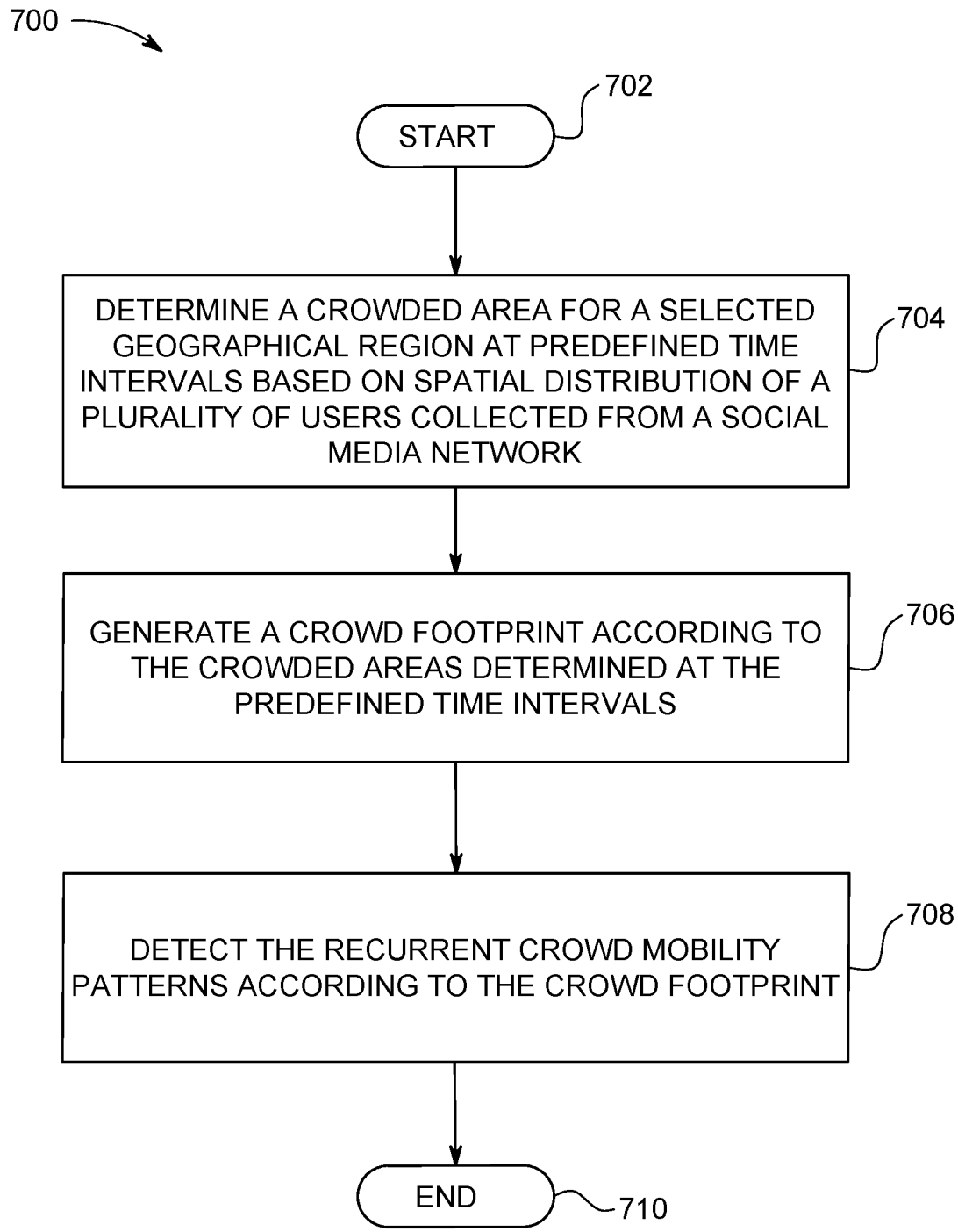
FIG. 7 is an additional flowchart diagram depicting an additional exemplary method for recognizing recurrent crowd mobility patterns by a processor, again in which aspects of the present invention may be realized.

Turning now to FIG. 7, a method 700 for recognizing recurrent crowd mobility patterns by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702. A crowded area may be determined for a selected geographical region at predefined time intervals based on spatial distribution of a plurality of users collected from a social media network, as in block 704. A crowd footprint may be generated according to the crowded areas determined at the predefined time intervals, as in block 706. Recurrent crowd mobility patterns may be detected according to the crowd footprint, as in block 708. The functionality 700 may end, as in block 710.

In one aspect, in conjunction with and/or as part of at least one block of FIG. 7, the operations of method 700 may include each of the following. The operations of method 700 may apply a kernel density estimation (KDE) operation for determining the crowded area. The crowded area may be determined based on a location and time of detected activity of the plurality of users from a location based social network (LBSN) dataset of the social media network. One or more data structures may be created for each of the predefined time intervals reflecting the crowd footprint. The recurrent crowd mobility patterns may be extracted from one or more data structures.

In an additional aspect, the operations of method 700 may apply the crowd footprint in a non-negative matrix factorization (NMF) operation so as to identify the recurrent crowd mobility patterns and determine a crowd mobility pattern of the plurality of users for each of the predefined time intervals. The recurrent crowd mobility patterns may be mapped and displayed via an interactive GUI display system of a computing device such as, for example, an IoT computing device in an IoT computing network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for recognizing recurrent crowd mobility patterns by a processor, comprising:
   receiving a location based social network (LBSN) dataset representative of detected activity of a plurality of users within a selected geographical region from an Internet-based social media networking application, wherein the LBSN dataset is generated according to check-ins to various locations within the selected geographical region as reported by respective devices associated with each of the plurality of users executing the Internet-based social media networking application;
   determining a crowded area for the selected geographical region at predefined time intervals based on spatial distribution of the plurality of users collected from the LBSN dataset received from the Internet-based social media networking application, wherein a kernel density estimation (KDE) operation is performed on information of the LBSN dataset to identify the crowded area, and wherein an output of the KDE operation is used to transform the information into one or more data structures;
   generating a crowd footprint according to the crowded areas determined at the predefined time intervals according to the output of the KDE operation as generated in the one or more data structures;
   initializing an unsupervised machine learning operation, implementing one or more clustering operations, on the one or more data structures to detect the recurrent crowd mobility patterns according to the crowd footprint;
   detecting an anomaly in the recurrent crowd mobility patterns according to a comparison of the crowd footprint at a current time to one of the recurrent crowd mobility patterns; and
   displaying data indicative of the recurring crowd mobility patterns and the detected anomaly thereof on a user interface.

2. The method of claim 1, further including creating the one or more data structures for each of the predefined time intervals reflecting the crowd footprint.

3. The method of claim 2, further including extracting the recurrent crowd mobility patterns from the one or more data structures.

4. The method of claim 1, further including applying the crowd footprint in a non-negative matrix factorization (NMF) operation so as to identify the recurrent crowd mobility patterns and determine a crowd mobility pattern of the plurality of users for each of the predefined time intervals.

5. The method of claim 1, further including mapping the recurrent crowd mobility patterns.

6. A system for recognizing recurrent crowd mobility patterns, comprising:
   one or more computers with executable instructions that when executed cause the system to:

receive a location based social network (LBSN) dataset representative of detected activity of a plurality of users within a selected geographical region from an Internet-based social media networking application, wherein the LBSN dataset is generated according to check-ins to various locations within the selected geographical region as reported by respective devices associated with each of the plurality of users executing the Internet-based social media networking application;

determine a crowded area for the selected geographical region at predefined time intervals based on spatial distribution of the plurality of users collected from the LBSN dataset received from the Internet-based social media networking application, wherein a kernel density estimation (KDE) operation is performed on information of the LBSN dataset to identify the crowded area, and wherein an output of the KDE operation is used to transform the information into one or more data structures;

generate a crowd footprint according to the crowded areas determined at the predefined time intervals according to the output of the KDE operation as generated in the one or more data structures;

initialize an unsupervised machine learning operation, implementing one or more clustering operations, on the one or more data structures to detect the recurrent crowd mobility patterns according to the crowd footprint;

detect an anomaly in the recurrent crowd mobility patterns according to a comparison of the crowd footprint at a current time to one of the recurrent crowd mobility patterns; and display data indicative of the recurring crowd mobility patterns and the detected anomaly thereof on a user interface.

7. The system of claim 6, wherein the executable instructions further create the one or more data structures for each of the predefined time intervals reflecting the crowd footprint.

8. The system of claim 7, wherein the executable instructions further extract the recurrent crowd mobility patterns from the one or more data structures.

9. The system of claim 6, wherein the executable instructions further apply the crowd footprint in a non-negative matrix factorization (NMF) operation so as to identify the recurrent crowd mobility patterns and determine a crowd mobility pattern of the plurality of users for each of the predefined time intervals.

10. The system of claim 6, wherein the executable instructions further map the recurrent crowd mobility patterns.

11. A computer program product for, by a processor, recognizing recurrent crowd mobility patterns, the computer program product comprising a non-transitory computer-readable storage medium having computer-readable program code portions stored therein, the computer-readable program code portions comprising:

an executable portion that receives a location based social network (LBSN) dataset representative of detected activity of a plurality of users within a selected geographical region from an Internet-based social media networking application, wherein the LBSN dataset is generated according to check-ins to various locations within the selected geographical region as reported by respective devices associated with each of the plurality of users executing the Internet-based social media networking application;

an executable portion that determines a crowded area for the selected geographical region at predefined time intervals based on spatial distribution of the plurality of users collected from the LBSN dataset received from the Internet-based social media networking application, wherein a kernel density estimation (KDE) operation is performed on information of the LBSN dataset to identify the crowded area, and wherein an output of the KDE operation is used to transform the information into one or more data structures;

an executable portion that generates a crowd footprint according to the crowded areas determined at the predefined time intervals according to the output of the KDE operation as generated in the one or more data structures;

an executable portion that initializes an unsupervised machine learning operation, implementing one or more clustering operations, on the one or more data structures to detect the recurrent crowd mobility patterns according to the crowd footprint;

an executable portion that detects an anomaly in the recurrent crowd mobility patterns according to a comparison of the crowd footprint at a current time to one of the recurrent crowd mobility patterns; and an executable portion that displays data indicative of the recurring crowd mobility patterns and the detected anomaly thereof on a user interface.

12. The computer program product of claim 11, further including an executable portion that:

creates the one or more data structures for each of the predefined time intervals reflecting the crowd footprint; and extracts the recurrent crowd mobility patterns from the one or more data structures.

13. The computer program product of claim 11, further including an executable portion that applies the crowd footprint in a non-negative matrix factorization (NMF) operation so as to identify the recurrent crowd mobility patterns and determine a crowd mobility pattern of the plurality of users for each of the predefined time intervals.

14. The computer program product of claim 11, further including an executable portion that maps the recurrent crowd mobility patterns.

\* \* \* \* \*